United States Patent [19]

Davis et al.

[11] Patent Number: 5,060,886
[45] Date of Patent: Oct. 29, 1991

[54] QUICK CHANGE WHEEL LANDING GEAR

[75] Inventors: Charles E. Davis, Arlington; J. Robert Duppstadt, Bedford, both of Tex.

[73] Assignee: Bell Helicopter Textron, Inc., Fort Worth, Tex.

[21] Appl. No.: 320,095

[22] Filed: Aug. 8, 1990

[51] Int. Cl.$^5$ .............................................. B64C 25/02
[52] U.S. Cl. ............................... 244/100 R; 244/17.17
[58] Field of Search ............... 244/100 R, 101, 904, 244/17.17

[56] References Cited

U.S. PATENT DOCUMENTS

| Re. 18,002 | 3/1931 | de al Cierva | 244/100 R |
|---|---|---|---|
| 2,108,747 | 2/1938 | Glover | 280/1 |
| 2,396,189 | 3/1946 | Millar | 244/105 |
| 2,707,084 | 4/1955 | Mills, Jr. | 244/101 |
| 2,826,434 | 3/1958 | Echols | 280/490 |
| 2,905,410 | 9/1959 | Bensen | 244/17.17 |
| 2,909,342 | 10/1959 | Maltby | 244/103 |
| 3,144,223 | 8/1964 | Nichols | 244/100 |
| 3,193,221 | 7/1965 | Victorian et al. | 244/100 |
| 3,347,499 | 10/1967 | Larkin | 244/101 |
| 3,520,497 | 7/1970 | Schramm | 244/17.11 |
| 4,033,422 | 7/1977 | Benning | 180/14 C |
| 4,270,711 | 6/1981 | Cresap et al. | 244/17.17 |
| 4,372,506 | 2/1983 | Cronk et al. | 244/100 R |
| 4,516,744 | 5/1985 | Burnside | 244/17.17 |
| 4,558,837 | 12/1985 | Mens et al. | 244/108 |
| 4,659,069 | 3/1987 | Odobasic | 244/104 R |

FOREIGN PATENT DOCUMENTS 1144134 10/1980 Canada .............................. 244/904
2560853 9/1985 France .............................. 244/904

Primary Examiner—Joseph F. Peters, Jr.
Assistant Examiner—Anne E. Bidwell
Attorney, Agent, or Firm—Richards, Medlock & Andrews

[57] ABSTRACT

A quick change wheel landing gear assembly (10) is provided as a replacement for a skid landing gear system on a vertical take-off and landing aircraft. The wheel landing gear assembly (10) includes a pair of spaced-apart fore and aft longitudinal tubes (16, 18) attached to a pair of short, spaced-apart cross tubes (20, 22) that are adapted to mount on the structural saddles (12, 14) used to mount the skid landing gear on the underside of the aircraft. The longitudinal tubes (16, 18) are connected together at the forward end for mounting a fully swiveling nose gear (26) thereto. Aft main gear wheels (30, 32) are mounted on cantilever landing gear legs (34, 36) that extend laterally from the longitudinal tubes (16, 18) adjacent the aft cross tube (22). Landing loads on the landing gear may be absorbed by resilient springs (25), deflection of the gear legs (34, 36) and the aft cross tube (22), torsion of the fore and aft longitudinal tubes (16, 18), or any combination of these actions. Resilient springs (25) are used in the landing gear assembly (10) to attenuate fatigue stresses in conjunction with the deflection of the longitudinal (16, 18) and cross tubes (20, 22) of the gear assembly (10). The wheel landing gear assembly (10) is designed to be mounted on existing aircraft structural saddles and to retain many of the desirable features of a skid landing gear system, including low cost and easy maintenance.

8 Claims, 2 Drawing Sheets

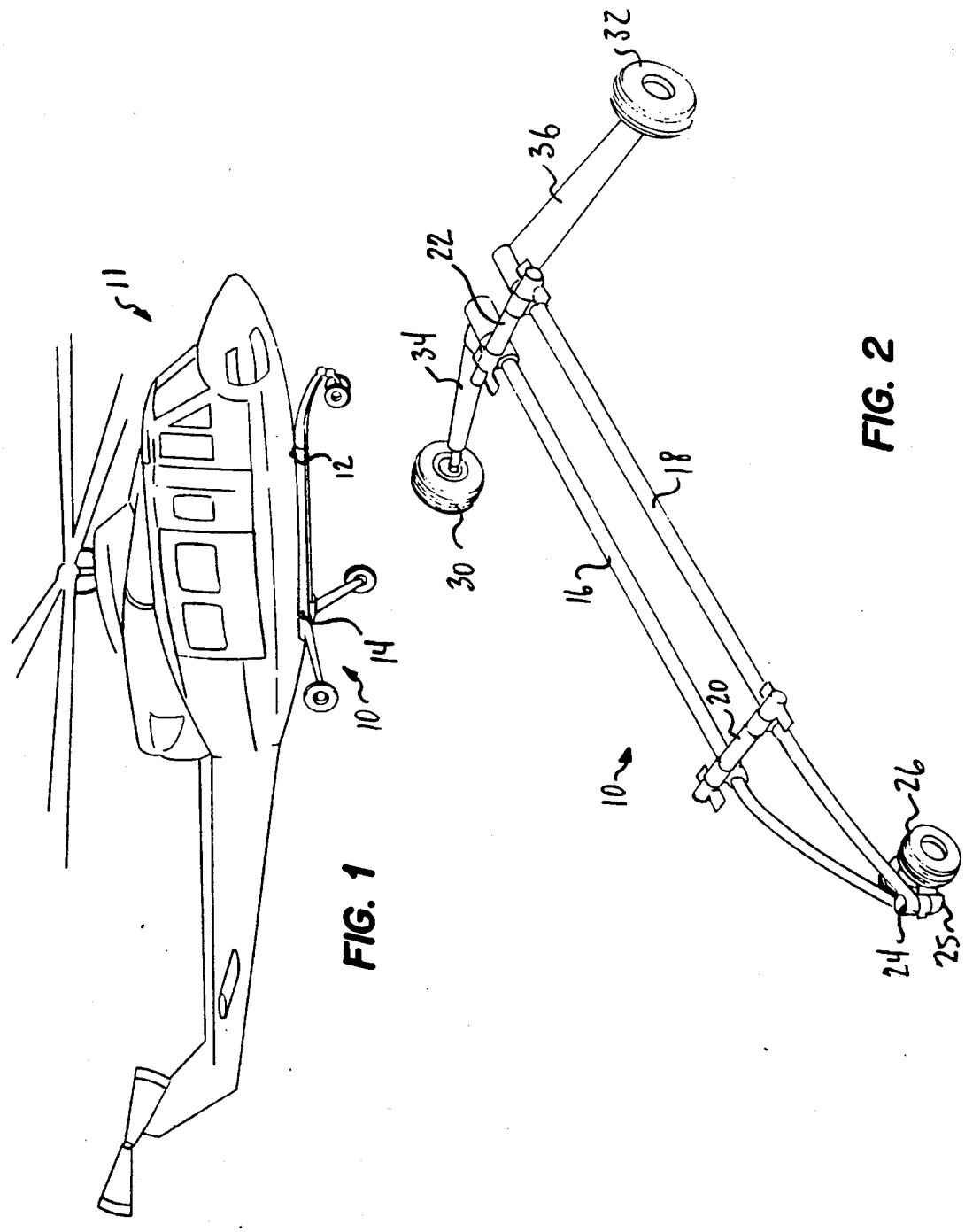

QUICK CHANGE WHEEL LANDING GEAR

TECHNICAL FIELD

This invention relates to aircraft landing gear systems and, in particular, to a quick change wheel landing gear assembly provided as an alternate system for a helicopter having a skid landing gear assembly.

BACKGROUND OF THE INVENTION

In helicopters and other vertical take-off and landing aircraft, various surface engaging systems may be used depending upon the operational requirements for landing the aircraft. For example, helicopter landing gear systems may comprise skids, skis, wheels, or floats. In those systems, the energy of the shock and stress encountered by the landing gear when it engages the surface may be absorbed by resilient springs, bending rods, torsion bars, air-filled bodies, or various combinations of these shock absorbing devices.

In some helicopter operational environments, it is highly desirable to be able to selectively change the helicopter landing gear configuration. In particular, it is sometimes necessary to modify a helicopter having a skid landing gear assembly by providing landing gear wheels to facilitate moving the aircraft on the ground.

Because of the critical nature of weight added to helicopters, wheel landing gear systems provided as addons to landing skids are undesirable. However, it is desirable to provide a wheel landing gear system that replaces landing skids quickly without requiring any special structural provisions. Thus, there is a need for an alternate wheel landing gear assembly that replaces a helicopter's skid landing gear and may be installed quickly using the same structural saddles used for the skid landing gear assembly.

SUMMARY OF THE INVENTION

The present invention comprises a wheel landing gear assembly designed as a quick change replacement for a skid landing gear assembly on a helicopter. The wheel landing gear assembly attaches to the helicopter at the same structural saddles used for attaching skid landing gear to the aircraft. Therefore, the present invention provides an alternate wheel landing gear assembly for a helicopter without adding special landing gear support structure other than minor brace and brake fittings. Furthermore, the quick change wheel landing gear assembly provides a ready means for back-fitting existing skid gear helicopters with a wheel landing gear system. Thus, new helicopters can be built without costly and heavy additional structures for mounting an alternate landing gear system.

The present invention is designed to preserve many desirable features of a skid landing gear system, including low cost and easy maintenance. A pair of fore and aft longitudinal tubes are attached to a pair of short, spaced-apart cross tubes that are positioned to be mounted on the helicopter structural saddles used to mount the skid landing gear. The longitudinal tubes act as energy absorbers for vertical loads during landing and also act to stabilize the landing gear in the presence of wheel drag loads during flight. The longitudinal tubes are connected together at the forward end for mounting a nose gear thereto. The nose gear is mounted so as to be fully swiveling and it may comprise dual wheels to reduce shimmy. The aft main gear wheels are mounted on cantilever landing gear legs extending laterally from the longitudinal tubes at positions near the aft cross tube. An alternate configuration includes shorter fore and aft tubes, not attached to the rear cross tube, but anchored at the back end to fittings on the main helicopter beams. A full length aft cross tube is used and is stabilized with drag braces from the ends of the fore and aft tubes to near the rear wheels on the cross tube.

During landing, nose gear loads are absorbed by bending deflection of the fore and aft longitudinal tubes. In addition, a resilient spring in the nose gear may be used to absorb energy in conjunction with the deflection of the longitudinal tubes. Landing loads on the aft main gear may be absorbed by resilient springs, bending deflection of the gear legs and the aft cross tube, torsion of the fore and aft longitudinal tubes, or any combination of these actions. Also, the aft main gear springs may be replaced by two aft cross tubes or one cross tube and a drag brace used as a combined bending tube and truss configuration in some operational applications of the landing gear system.

Regular landing and taxiing loads and vibrations are absorbed by the springs and the deflection of the longitudinal and cross tubes of the landing gear. Many different types of springs may be used in the landing gear assembly, as is well known in the art. However, resilient springs are used in the present invention to attenuate fatigue stresses in conjunction with the deflection of the longitudinal and cross tubes of the landing gear assembly.

BRIEF DESCRIPTION OF THE DRAWINGS

For a more complete understanding of the present invention and for further advantages thereof, reference is made to the following Description of the Preferred Embodiment taken in conjunction with the accompanying Drawings, in which:

FIG. 1 illustrates the quick change wheel landing gear assembly of the present invention installed on a helicopter;

FIG. 2 is a perspective view of the quick change wheel landing gear assembly removed from the helicopter.

DESCRIPTION OF THE PREFERRED EMBODIMENTS

Figure 3:
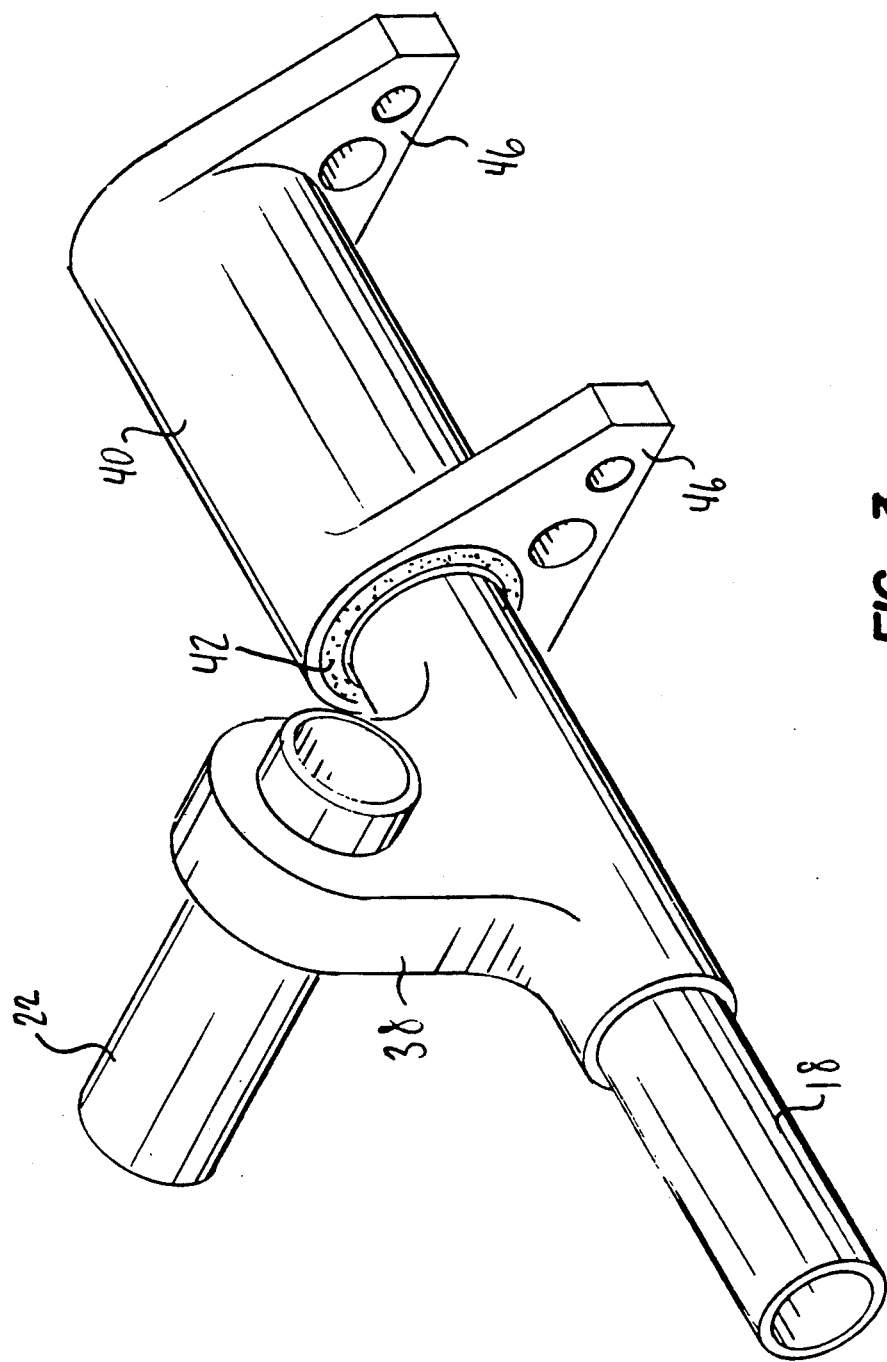
FIG. 3 is a perspective view of a portion of the present invention showing the elastomeric bearing and support assembly for the aft main landing gear.

Referring to FIG. 1, quick change tricycle landing gear assembly 10 is shown mounted on a helicopter 11. Landing gear assembly 10 is designed to replace a skid landing gear assembly by mounting directly to the structural saddles 12 and 14 used to mount the skid landing gear assembly to the underside of helicopter 11.

Referring to FIG. 2, landing gear assembly 10 is shown removed from helicopter 11. Landing gear assembly 10 comprises a pair of spaced-apart fore and aft tubes 16 and 18 that extend generally parallel to each other and the longitudinal axis of helicopter 11. Fore and aft tubes 16 and 18 are attached to a pair of short, spaced-apart cross tubes 20 and 22. Fore and aft tubes 16 and 18 and cross tubes 20 and 22 are rigidly connected by means of standard fittings that are well known in the art. At the forward end of landing gear assembly 10, fore and aft tubes 16 and 18 converge downward together and are rigidly connected to a pivot bearing assembly 24 having a generally vertical axis for nose gear 26 to swivel about. Nose gear 26 may be mounted on a trailing arm connected to a spring assembly 25 mounted for rotation about the axis of pivot bearing 24. Spring assembly 25 absorbs vibrations and small deflections of nose gear 26 during taxiing to reduce fatigue loads in the fore and aft tubes 16 and 18. In addition, nose gear 26 may comprise dual nose wheels to reduce shimmy of nose gear 26.

The aft portion of landing gear assembly 10 comprises main gear wheels 30 and 32 mounted on cantilever landing gear legs 34 and 36. Main gear legs 34 and 36 are mounted on fore and aft tubes 16 and 18, respectively, so as to extend laterally therefrom adjacent the aft cross tube 22. Landing loads on the main gear wheels 30 and 32 may be absorbed by deflection of the gear legs 34 and 36, resilience of springs connecting the gear legs 34 and 36 to the longitudinal tubes 16 and 18, deflection of the aft cross tube 22, torsion of the fore and aft longitudinal tubes 16 and 18, or any combination of these actions.

Referring to FIG. 3, a connection bracket 38 is shown connecting fore and aft tube 18 to aft cross tube 22. An elastomeric bearing 40 is mounted on tube 18 aft of cross tube 22 and bracket 38. A cylindrical elastomeric spring 42 may be bonded to the inside surface of bearing 40 and to the outside surface of longitudinal tube 18 inserted into bearing 40. Bearing 40 may include a pair of lugs 46 for mounting aft gear leg 36 thereto. Longitudinal tube 16 includes a similar connection bracket and an elastomeric bearing with lugs for mounting aft gear leg 34 thereto.

Landing gear assembly 10, as shown in FIGS. 1 and 2, is designed as a quick change replacement for a skid landing gear system on helicopter 11. The cross tubes 20 and 22 of gear assembly 10 are adapted to attach to the same structural saddles 12 and 14 used for attaching the skid landing gear to the underside of helicopter 11. Alternatively, landing gear assembly 10 may include fore and aft longitudinal tubes 16 and 18 being connected at the aft end to the back end fittings on the main helicopter beam in which case, a full length aft cross tube is used and is stabilized with drag braces from the ends of fore and aft tubes 16 and 18.

Landing gear assembly 10 is a low cost system that incorporates many of the maintenance free features of a skid landing gear system. The only additional accessory that may be required is an hydraulic brake system for the main gear wheels. Because landing gear assembly 10 provides a quick means for back-fitting existing skid gear helicopters with a wheel landing gear system without requiring major costly and heavy additional mounting structures, landing gear assembly 10 eliminates the previous weight and cost penalties incurred when providing wheels for helicopters equipped with skid landing systems.

Although the present invention has been described with respect to a specific embodiment thereof, various changes and modifications to the described embodiment may be suggested to one skilled in the art. Therefore, it is intended that the present invention encompass such changes and modifications as fall within the scope of the appended claims.

We claim:

1. A wheel landing gear assembly for a vertical take-off and landing aircraft, comprising:
    a cross tube adapted for removably mounting the gear assembly on the underside of the aircraft;
    a pair of fore and aft tubes attached to said cross tube, said fore and aft tubes extending generally parallel to the longitudinal axis of the aircraft when the gear assembly is removably mounted on the aircraft, said fore and aft tubes converging together downward and forward of said cross tube and terminating at a pivot bearing attached thereto;
    a pivotable nose gear mounted to said pivot bearing by means of a spring assembly;
    a cantilever main gear leg mounted to and extending laterally outward from the aft end of each of said fore and aft tubes;
    an elastomeric bearing mounted between of said fore and aft tubes and said corresponding main gear leg; and
    a main gear wheel mounted on the laterally extending end of each of said main gear legs.

2. The landing gear assembly of claim 1, wherein aircraft landing stresses are absorbed by deflection of said main gear legs, resilience of said elastomeric bearings, and torsion of said fore and aft tubes.

3. A quick change tricycle landing gear assembly for a vertical take-off and landing aircraft, comprising:
    a pair of fore and aft tubes adapted for extending generally parallel to a longitudinal axis of the aircraft;
    a forward cross tube and an aft cross tube attached to said pair of fore and aft tubes, said cross tubes adapted to be removably mounted on the underside of the aircraft, said fore and aft tubes converging downward and forward of said forward cross tube and terminating at a pivot bearing attached thereto;
    a pivotable nose gear mounted to said pivot bearing by means of a spring assembly;
    a cantilever main gear leg mounted to and extending laterally outward from the aft end of each of said fore and aft tubes adjacent said aft cross tube; and
    a main gear wheel mounted on the laterally extending end of each of said main gear legs.

4. The landing gear assembly of claim 3, further comprising an elastomeric bearing mounted between each of said main gear legs and said fore and aft tubes.

5. The landing gear assembly of claim 4, wherein said nose gear comprises dual wheels.

6. The landing gear assembly of claim 5, wherein aircraft landing stresses are absorbed by resilience of said nose and main wheels, resilience of said spring assembly mounting said nose gear to said pivot bearing, deflection of said fore and aft tubes and said cross tubes, deflection of said main gear legs, resilience of said elastomeric bearings, and torsion of said fore and aft tubes.

7. A quick change tricycle landing gear assembly adapted for replacing a skid landing gear system on a helicopter, the assembly comprising:
    a pair of fore and aft tubes adapted for extending generally parallel to a longitudinal axis of the helicopter;
    a forward cross tube and an aft cross tube attached to said pair of fore and aft tubes, said cross tubes adapted for mounting on the skid gear structural saddles on the underside of the helicopter;
    said fore and aft tubes converging together downward and forward of said forward cross tube and terminating at a pivot bearing attached thereto;
    a pivotable nose gear comprising dual wheels mounted to said pivot bearing by means of a spring assembly;

a cantilever main gear leg mounted to and extending laterally outward from each of said fore and aft tubes adjacent said aft cross tube;

an elastomeric bearing mounted between each of said fore and aft tubes and said corresponding main gear leg; and a main gear wheel mounted on the laterally extending end of each of said main gear legs.

8. The landing gear assembly of claim 7, wherein helicopter landing stresses on said landing gear assembly are absorbed by said spring assembly and said elastomeric bearings, deflection of said main gear legs, and torsion of said fore and aft tubes.

* * * * *

UNITED STATES PATENT AND TRADEMARK OFFICE
CERTIFICATE OF CORRECTION

PATENT NO. : 5,060,886

DATED : October 29, 1991

INVENTOR(S) : Davis, et al.

It is certified that error appears in the above-identified patent and that said Letters Patent is hereby corrected as shown below:

Column 1, line 29, delete "addons" and insert therefore --add-ons--.

Column 4, line 13, after "between" insert --each--.

Signed and Sealed this

Thirtieth Day of March, 1993

Attest:

STEPHEN G. KUNIN

*Attesting Officer*     *Acting Commissioner of Patents and Trademarks*